No. 691,846. Patented Jan. 28, 1902.
E. DOMINY.
HARVESTER.
(Application filed June 3, 1901.)
(No Model.)

WITNESSES
E. J. Nottingham
G. F. Downing

INVENTOR
E. Dominy
By H. A. Seymour
Attorney

THE NORRIS PETERS CO., PHOTO-LITHO., WASHINGTON, D. C.

UNITED STATES PATENT OFFICE.

EZRA DOMINY, OF FREDERICK, SOUTH DAKOTA.

HARVESTER.

SPECIFICATION forming part of Letters Patent No. 691,846, dated January 28, 1902.

Application filed June 3, 1901. Serial No. 63,004. (No model.)

*To all whom it may concern:*

Be it known that I, EZRA DOMINY, a resident of Frederick, in the county of Brown and State of South Dakota, have invented certain new and useful Improvements in Harvesters; and I do hereby declare the following to be a full, clear, and exact description of the invention, such as will enable others skilled in the art to which it appertains to make and use the same.

My invention relates to an improvement in harvesters, and more particularly to that class of harvesters known as "headers," the object of the invention being to provide an improved device of this character wherein the use of apron or other mechanical conveyers for the grain will be dispensed with.

A further object is to provide an improved harvester in which an air current or blast is employed for conveying the heads of the grain after being cut.

With these objects in view the invention consists in certain novel features of construction and combinations and arrangements of parts, as will be more fully hereinafter described, and pointed out in the claims.

Figure 1:
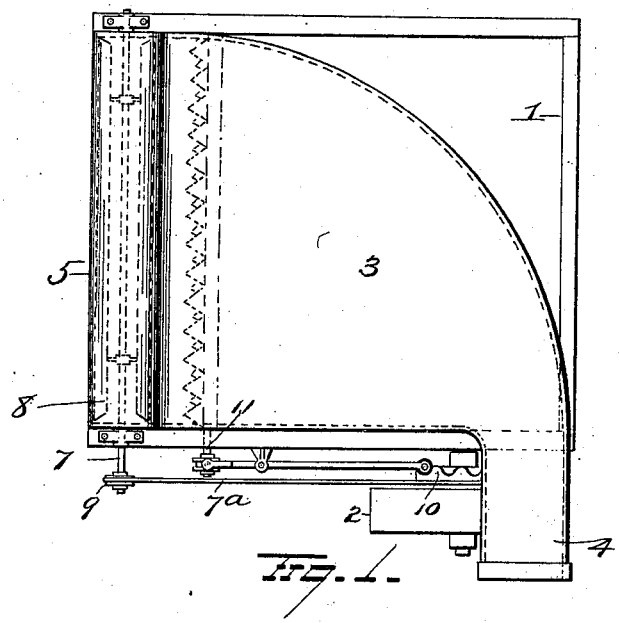
Figure 2:
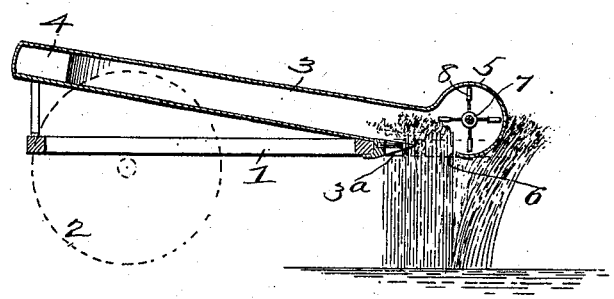

In the accompanying drawings, Figure 1 is a plan view illustrating my improvements, and Fig. 2 is a view in section of the same.

1 represents the ordinary platform or frame of a harvester supported on wheels 2 and carrying my improvements, as will now be explained.

A knife or cutter $3^a$ is supported at the forward end of frame 1 and adapted to reciprocate in the forward end of a grain-receiver 3, which latter comprises a flat casing or tube gradually tapering upward and contracted or growing smaller and curving to one side of the frame and terminating in a contracted discharge-port 4 at one side of the frame to deposit the grain into a suitable receptacle or wagon driven beside the harvester for the purpose. The upper or top wall of the casing 3 extends beyond the lower wall and is connected to a cylindrical fan-chamber 5, having its blast-discharge opening 6 in alinement with the chamber 3. A shaft 7 is revolubly mounted in fan-chamber 5 and carries any number of fan-blades 8 and projects at one end through the end of the chamber. A pulley 9 is secured on the projecting end of shaft 7 and connected by a belt or strap $7^a$ with a pulley 10 on the main axle or made integral with the bull-wheel of the harvester, and the knife or cutter $3^a$ is provided with a rod 11, projecting through one side of casing 3, and connected by suitable operating mechanism with said bull-wheel for reciprocating the cutter.

In operation the cylindrical fan-chamber 5 first strikes the upper ends of the grain and forces them downward to permit the chamber to pass over, when they spring up into the space between the chamber 5 and receiver and are forced back against the knife or cutter by the blast from the fan-chamber and are cut, when the strong blast of air through the receiver carries the heads of grain through the same and out the discharge-port into the receptacle.

It will thus be seen that with my improvements above described the use of belt or other mechanical conveyers is entirely dispensed with, as they are liable to and, in fact, do get out of order, are expensive, and are liable to become choked by the accumulation of grain, while with my improvements the air-blast not only forces the grain rapidly through the receiver, but also insures all the grain being cut, as it forces the same against the cutter and prevents its escape.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a harvester, the combination with a frame, of a cutter, a tubular grain-receiver on the frame having a wide forward end disposed above the cutter and terminating at its rear end in a lateral discharge-spout, and a fan in the wide end of the tubular receiver in advance of the cutter.

2. In a harvester, the combination with a supporting-frame, of a tubular grain-receiver supported on the frame, widest at its forward end and tapering slightly upward to and provided with a contracted discharge end which projects to one side of the frame, a cutter in the inlet end of the receiver, a fan-chamber in front of the cutter, a fan in said chamber and means for operating the fan to discharge a blast of air against the cutter and through the receiver.

In testimony whereof I have signed this specification in the presence of two subscribing witnesses.

EZRA DOMINY.

Witnesses:
 JOHN A. FYLPAA,
 THOS. H. FYLPAA.